United States Patent Office 3,445,181
Patented May 20, 1969

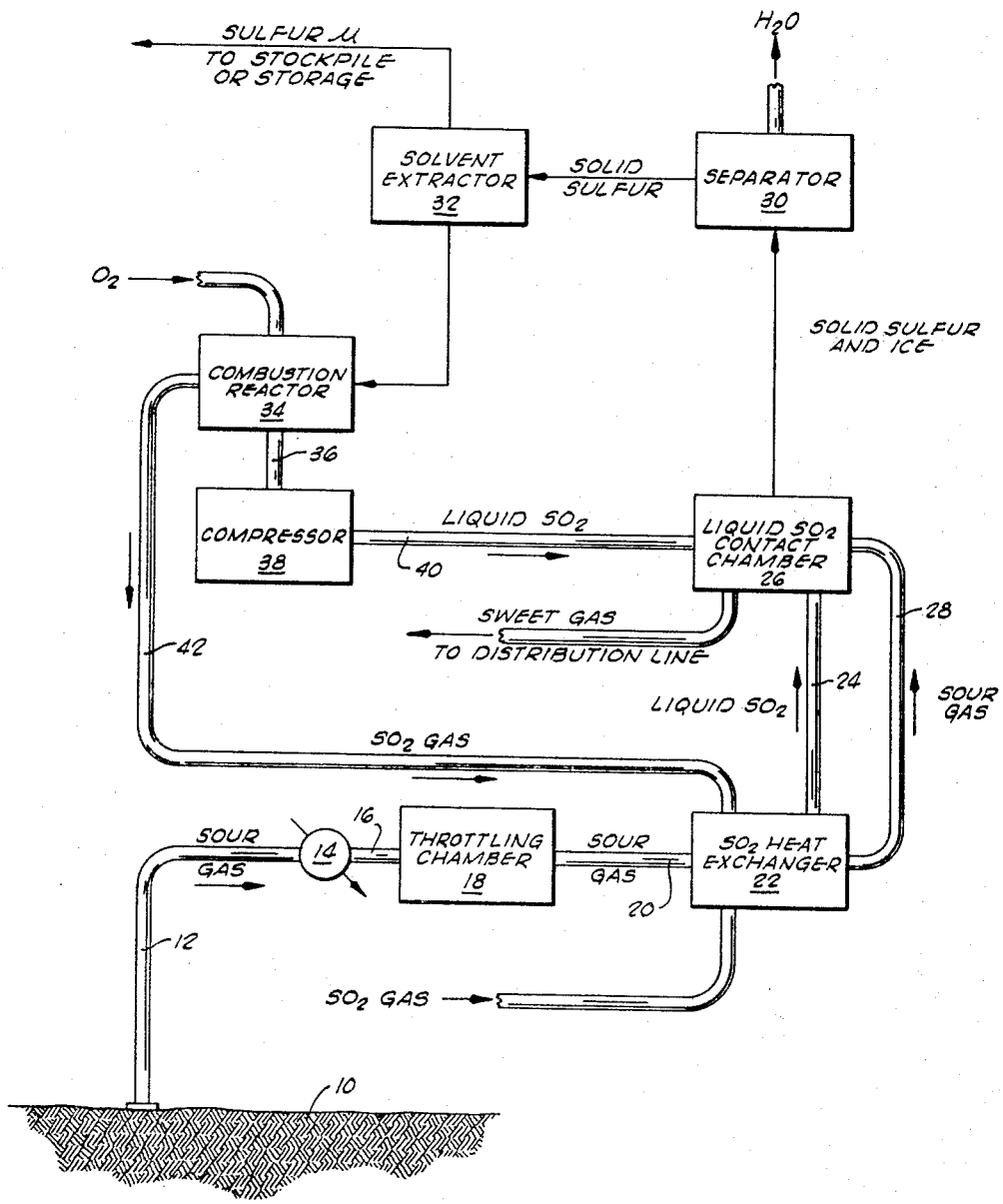

3,445,181
PRODUCING SULFUR FROM HYDROGEN
SULFIDE-CONTAINING GASES
Richard L. Every and Ralph Leroy Grimsley, Ponca City, Okla., assignors to Continental Oil Company, Ponca City, Okla., a corporation of Delaware
Filed Dec. 30, 1964, Ser. No. 422,257
Int. Cl. C02b 17/04, 17/06
U.S. Cl. 23—2   7 Claims

ABSTRACT OF THE DISCLOSURE

A hydrogen sulfide-containing gas is contacted with an anhydrous liquid sulfur dioxide at a temperature wherein the water of reaction resulting from $H_2S$ and $SO_2$ reacting to form sulfur and water is crystallized produces sulfur of high amorphous or sulfur $\mu$ content. It is preferred to utilize the hydrogen sulfide-containing gas under pressure and to expand same to maintain the $SO_2$ at the desired temperature.

---

This invention relates to a method for producing elemental sulfur from hydrogen sulfide, or from gases which contain hydrogen sulfide. In a more specific, though non-limiting aspect, the invention relates to a method for purifying various hydrogen sulfide-containing gases by removing substantially all of the hydrogen sulfide therefrom. In yet another specific, though non-limiting aspect, the invention relates to a process for producing substantial amounts of sulfur in its carbon disulfide-insoluble, amorphous allotropic form known as sulfur $\mu$ or $S_6$.

As is well known, there is currently a very large production of natural gas in the United States and large, unproduced reserves of this material are also known to exist. Natural gas as it occurs in the earth, frequently contains sulfur compounds, including a substantial amount of $H_2S$, which render the natural gas unsuitable for many uses. This so-called sour natural gas must therefore be "sweetened" by removal of the mercaptans and $H_2S$ in order to permit it to have the widest range of usefulness. Hydrogen sulfide contamination is also characteristic of certain other gases, such as refinery off gases and coke oven gases, which can be usefully employed in some applications if the sulfur contaminants are removed.

One method which has heretofore been widely used for sweetening sour gases has been to initially pass the raw, sour gas through an alkylamine to remove the $H_2S$ therefrom. The $H_2S$ is then stripped from the alkylamine by heating, and is fired in a combustion chamber to convert about one-third of the gas to $SO_2$. The $SO_2$ is then passed in gaseous form over a catalyst at high temperatures to yield sulfur and water vapors, which in turn are separated by condensing the sulfur. Although the use of this process for sweetening sour gases and concurrently producing elemental sulfur has increased threefold over the last ten years, several undesirable aspects remain characteristic of the method. First, high temperatures are required to strip the $H_2S$ from the alkylamine and to convert a part of the $H_2S$ to $SO_2$ by combustion. Another undesirable feature of the process is the requirement for expensive catalytic materials. The catalyst employed becomes contaminated in a relatively short time and must be regenerated or replaced. Another disadvantage of the process is that the $SO_2$ at high temperatures is extremely corrosive to most metals.

The present invention provides an improved process for purifying gaseous materials which contain hydrogen sulfide. Viewed in a different light, the process constitutes a method for quickly and economically producing sulfur. An ancillary, but important, advantage of the process is that a large percentage of the solid sulfur product of the process is in the allotropic form known as sulfur $\mu$.

Sulfur $\mu$ is an amorphous, carbon disulfide-insoluble form of the element, and is highly useful in the compounding of rubber materials. Its value is substantially greater than the crystalline form of sulfur which is more easily produced, and more widely available, and the production of large quantities of the sulfur $\mu$ by the process of the present invention therefore constitutes a marked advantage over prior processes which yield primarily the crystalline or sulfur $\lambda$ form of the element.

Broadly described, the present invention comprises passing gaseous hydrogen sulfide through a body of substantially anhydrous, liquid sulfur dioxide to produce, by reaction of the hydrogen sulfide with the sulfur dioxide, solid sulfur and water. In the preferred pratice of the invention, the water occurs as ice and can be easily separated from the liquid $SO_2$. 50 percent or more of the solid sulfur which is produced by the producedure is yielded in the amorphous, carbon disulfide-insoluble form known in the art as sulfur $\mu$ and therefore is of premium value.

As will be understood from the fact that the hydrogen sulfide is passed into liquefied $SO_2$ (boiling point $-10°$ C.), the method, when carried out at atmospheric pressure, requires no heat input as has been the case with many prior processes, and the economy with which the purification of sour gases can be effected is thus substantially improved. Additionally, the process is well adapted for purifying sour natural gas taken directly from the earth in that the gas is normally produced at superatmospheric pressures, and this natural pressure may be employed for aiding in condensing the sulfur dioxide, and/or for removing the heat of reaction which occurs in the reaction of the hydrogen sulfide with the sulfur dioxide. In some instances of high pressure gas wells, the pressure of the gas may for some time be sufficient to permit a portion of the energy naturally possessed by the gas to be used for liquefying the $SO_2$ and removing the heat of reaction from the reaction vessel with yet sufficient residual energy remaining in the natural gas to permit it to be easily pressured to and through distribution pipelines.

From the foregoing description of the invention, it will be apparent that the present invention provides a novel and highly useful process for purifying sour gases by removing substantially all of the hydrogen sulfide gas therefrom.

A more specific object of the present invention is to provide a process for efficiently removing hydrogen sulfide gas from various gaseous materials contaminated therewith in a substantially more economical manner than has been characteristic of many processes heretofore in use for this purpose.

Another object of the present invention is to provide an improved method for producing relatively good yields of amorphous, carbon disulfide-insoluble sulfur from hydrogen sulfide gas.

An additional object of the present invention is to provide a method for quickly and economically producing sulfur from hydrogen sulfide-containing gases.

Another object of the present invention is to provide a process for purifying sour gases by the removal of hydrogen sulfide therefrom, which process does not result in the production of corrosive materials to the extent characteristic of previous processes of this type.

A more specific object of the present invention is to provide a procedure for sweetening sour natural gas as the natural gas is taken directly from the earth during production, or as it is released from an underground storage facility where it has been stored under superatmospheric pressure.

In addition to the foregoing objects and advantages, additional objects will become apparent as the following detailed description of the invention is read in conjunction with the accompanying drawing which is a flow diagram schematically illustrating the practice of the invention.

Before referring specifically to the accompanying drawing, it is believed that comprehension of the invention will be furthered by initially briefly discussing the thermodynamics of the reaction which constitutes the basis of the invention.

The reaction which is used in the process of the invention is written as $$2H_2S_{(g)} + SO_{2(l)} \rightleftharpoons 3S_{(s)} + 2H_2O_{(s)}$$

where the subscripts denote the states of the material, i.e. either solid, liquid or gas.

The usual free energy expression for the above reaction when carried out at 25° C., is given by $$\Delta F° \text{ reaction} = 3\Delta F°_{S_{(s)}} + 2\Delta F°_{H_2O_{(s)}} - \Delta F°_{SO_{2(l)}} - 2\Delta F°_{H_2S_{(g)}}$$

and, upon substituting corresponding values in the free energy expression, is obtained $$\Delta F° \text{ reaction} = 3(.018) + 2(-56.41) - (-70.0) - 2(-7.48) = 27 \text{ kcal./mole}$$

It is thus noted that the reaction proceeds spontaneously at 25° C.

The thermodynamic expression for the most widely used current method of producing sulfur by the reaction of hydrogen sulfide with sulfur dioxide in the gaseous state can be compared with the thermodynamics of the reaction of this invention. The reaction in current use may be expressed as $$2H_2S_{(g)} + SO_{2(g)} \rightleftharpoons 3S_{(g)} + 2H_2O_{(g)}$$

The usual free energy expression for this reaction at 25° C. is given by $$\Delta F° \text{ reaction} = 3\Delta F°_{S_{(g)}} + 2\Delta F°_{H_2O_{(g)}} - \Delta F°_{SO_{2(g)}} - 2\Delta F°_{H_2S_{(g)}}$$

Substituting appropriate values $$\Delta F° \text{ reaction} = 3(43.6 + 2(-54.6) - (71.8) - 2(-7.9) = 109 \text{ kcal./mole}$$

It is apparent that the reaction of the gaseous hydrogen sulfide with gaseous sulfur dioxide does not proceed spontaneously, and the large positive free energy value of 109 kilocalories/mole explains why a large amount of thermal energy must be employed in order to carry out the reaction currently in use.

If the above thermodynamic considerations are carried one step further, it can be shown that the range of temperatures over which the present invention may be carried out is considerably broader than the equivalent range which is characteristic of the commercial method now in use. Thus, in the absence of available heat capacity data, if it be assumed that heat capacities can be neglected for a first approximation, then $\Delta H°_{298} = \Delta H°_0$, and the corresponding free energy expressions as a function of temperature, T, are given by $$\Delta F°_T \text{ (for this invention)} = -34 + .02T \text{ kcal./mole}$$

and $$\Delta F°_T \text{ (present commercial method)} = 125 - .05T \text{ kcal./mole}$$

Although the coefficients of T are, of course, in error due to the neglect of heat capacities, the constants $-34$ and $125$ clearly show that the free energy values will allow the reaction of the present invention to proceed at ambient temperatures, but will prohibit the presently used commercial process from occurring unless the temperature is considerably above room temperature.

In summary, the foregoing thermodynamic considerations clearly indicate that whether the process of the present invention is conducted at atmospheric pressures at temperatures below $-10°$ C., at which temperature the $SO_2$ is in liquid form, or is instead carried out under a pressure sufficiently to liquefy the $SO_2$ atambient temperatures, the energy requirements for the process of the present invention are considerably less than the energy required to produce sulfur by reacting gaseous hydrogen sulfide and gaseous $SO_2$.

In our investigations of the process of the present invention, we have determined that the yield of sulfur diminishes as the temperature at which the reaction is carried out is decreased. On the other hand, although no substantial difference is effected in the foregoing thermodynamic considerations if the water product is permitted to exist in liquid, as opposed to solid form, it is much preferred to maintain the temperature and/or pressure in the reaction zone at levels such that the water produced by the reaction occurs as ice. This prevents hydration of the liquid $SO_2$, thus reducing the problem of corrosion, and simplifying the separation of the reaction products from each other and from the liquid $SO_2$ into which the gaseous hydrogen sulfide reactant is passed. In view of these considerations bearing upon the temperature range employed, it is preferred to utilize a temperature in the reaction zone of from about $-60°$ C. to about $-10°$ C. at atmospheric pressure.

It has been surprisingly determined that of the solid sulfur which is produced in the process of the invention, over 50 percent of the element is in the carbon disulfide-insoluble form known as sulfur $\mu$. Since the sulfur in this form is much more valuable than other allotropic crystalline forms, this characteristic of the process constitutes a marked advantage over other presently used processes of preparing sulfur from hydrogen sulfide. The amorphous sulfur $\mu$ can be easily separated from the crystalline sulfur with which it is intimately mixed in the product due to the marked difference in solubility of the several forms in carbon disulfide.

Due to the elimination of the requirement for very high heat inputs to the reaction in order to produce elemental sulfur from hydrogen sulfide, the present process is well adapted for use in conjunction with natural gas production processes for purifying or sweetening the natural gas at, or relatively close to, the well site. This is because the natural gas is produced under naturally occurring pressures which are typically as high as 1000 p.s.i., and sometimes as high as 2000 p.s.i. for a period of several months, or possibly a few years, after the well is brought in. A portion of the potential energy of the gas under pressure can be used to effect liquefaction of the sulfur dioxide reactant, or removal of the heat of reaction from the reaction zone, or both, with sufficient residual energy remaining in the gas to permit it to be pressured through distribution pipelines to desired destinations.

The manner in which the process of the present invention can be associated with a source of natural gas under pressure, whether such source be a natural reservoir or an artificial natural gas storage facility, is illustrated in the accompanying drawing. From the ground 10 the sour, hydrogen sulfide-containing, natural gas is conveyed at its natural pressure of from about 1000 p.s.i. to about 2000 p.s.i. by a pipeline 12 through a heat exchanger 14 where its temperature is reduced sufficiently (say to about 15° C.) in an initial step to permit the temperature to be further reduced to a desired ultimate level by throttling. The sour gas is then passed through a conduit 16 to a throttling chamber 18 where it is expanded through jets so as to undergo a pressure reduction to about 400 p.s.i., this pressure being approximately that normally required in the pipeline distribution of natural gas. Accompanying such expansion, the sour gas undergoes a further temperature reduction. Where the natural gas is removed from the reservoir at a pressure of about 1000 p.s.i. and reduced to about 15° C. in temperature by the heat exchanger 14, the temperature attained by throttling to 400 p.s.i. will be about 0° C. If the pressure of the gas as it emanates from the reservoir is 1800 p.s.i., however, the temperature can be reduced to about −40° C. by throttling.

The low temperature sour gas is then passed through a sulfur dioxide heat exchanger 22 where, assuming its temperature has been reduced to below −10° C., it is used to condense gaseous sulfur dioxide. It will be apparent that, as an alternative procedure, the high pressure natural gas emanating from the natural gas reservoir or storage facility through the pipeline 12 could be employed to operate a compressor to compress the gaseous sulfur dioxide and thereby convert it to the liquid state. In this alternative procedure, the heat exchanger 14 and throttling chamber 18 would be eliminated. It should also be pointed out that in the case of natural gas which is produced at a relatively low pressure, it may be necessary to use a supplementary source of energy, such as an electrically powered compressor or the like, to complete the conversion of the gaseous sulfur dioxide to the liquid state.

The liquid $SO_2$ from the $SO_2$ heat exchanger 22 is passed through a conduit 24 to a contact chamber 26. The sour gas from the $SO_2$ heat exchange chamber 22 is conveyed to the contact chamber 26 by a suitable pipe or conduit 28. The sour gas is permitted to bubble into the body of liquid $SO_2$ contained in the contact chamber 26 and upon contact with the liquid $SO_2$, the reaction hereinbefore described takes place. Thus, the products of the reaction, solid sulfur and ice are produced in the body of the likuid $SO_2$. These solid materials will separate from the liquid $SO_2$ due to density differences and can be removed from the liquid $SO_2$ by procedures and apparatus which are known in the art and commercially available.

The solid sulfur and ice are then conveyed by a suitable device from the contact chamber to a separator 30 where the ice can be melted and the water then separated from the solid sulfur. The solid sulfur is then dried (by apparatus not shown) and may be conveyer to a stockpile or to storage, or alternatively, may be partially disposed of in this manner and partially employed for providing makeup $SO_2$ for recycling to either the sulfur dioxide heat exchanger 22 or the contact chamber 26.

It will be apparent that if a portion of the solid sulfur product is to be employed for regenerating sulfur dioxide, the portion used for this purpose will preferably be the less valuable crystalline allotropic form of the element. It is therefore desirable to include in the materials flow arrangement illustrated in the drawing, a solvent extractor 32 or other suitable type of separator for the purpose of isolating the carbon disulfide-insoluble sulfur $\mu$ from the less desirable crystalline forms of the element. The sulful $\mu$ can then be stockpiled or stored, and the crystalline forms converted to the makeup sulfur dioxide in the manner hereinbefore described.

Conversion of the sulfur to sulfur dioxide is effected in the conventional manner by reaction with oxygen in a combustion reactor 34. If the sulfur dioxide thus produced is to be returned directly to the contact chamber 26, it is initially passed via a conduit 36 through a suitable compressor 38 for liquefaction, and is then passed through the conduit 40 to the contact chamber 26. If desired, the compressor 38 can be driven by a portion of the high pressure sour gas from the pipeline 12. As an alternative procedure, instead of compressing the sulfur dioxide produced in the combustion reactor 34, the gas may be passed directly from the combustion reactor through a suitable pipeline 42 to the sulfur dioxide heat exchanger 22 where it is converted to the liquid state by heat exchange with the cold sour gas delivered to the heat exchanger from the throttling chamber 18.

As further exemplary of the practice of the present invention and the results obtained therefrom, the following table sets forth data which were obtained in laboratory evaluations of the process of the invention, and also, for comparison purposes, the results obtained when the hydrogen sulfide and sulfur dioxide were brought into contact with each of these reactants in the liquid state. In each case, the reactions were carried out at atmospheric pressure and the quantity of $H_2S$ introduced to the $SO_2$ was measured. The sulfur $\mu$ content of the product was determined by measuring that portion of the product which was insoluble in carbon disulfide when refluxed for a period of four hours.

TABLE I

| State of reactants | Temp., ° C. | Run time minutes | Wt. of S,[1] grams | Percent yield based on $H_2S$ | Percent $S\mu$[2] |
|---|---|---|---|---|---|
| $H_2S_{(g)}$ bubbled into $SO_{2(l)}$ | −60 | 180 | 53 | 35 | 54 |
| Do | [3]−40 to −10 | 25 | 23 | 90 | 50 |
| Do | −70 | 120 | 23 | 23 | ([5]) |
| $H_2S_{(l)}$ mixed with $SO_{2(l)}$ | [3]−80 to −10 | ([4]) | 2.5 | 12.5 | ([5]) |

[1] This is the total weight of sulfur (all forms) recovered from the liquid $SO_2$.
[2] This is the weight per cent of the total sulfur produced which has sulfur $\mu$.
[3] In these runs the heat of reaction was permitted to bring the temperature from its initial value up to the boiling point of the $SO_2$ over the period of the run.
[4] Mixed and let warm.
[5] Not measured.

From the data set forth in the preceding table, it will be perceived that relatively good yields of sulfur were obtained when the process was carried out in the preferred temperature range hereinbefore described, i.e., from about −60° C. to about −10° C. At lower temperatures, the yield of sulfur decreases. Even at such lower temperatures, however, it will be perceived that substantially better yields are obtained when the hydrogen sulfide is contacted as a gas with the liquid $SO_2$ than are obtained when both of the reactants are in the liquid state.

From the foregoing description, it will be apparent that this invention provides an efficient and very economical method for preparing elemental sulfur from hydrogen sulfide, and that such process has particular utility in sweetening or purifying gaseous materials which contain undesirable quantities of hydrogen sulfide. It has been determined that the hydrogen sulfide content of sour natural gas can be reduced to less than 10 p.p.m. through the use of the process, thus rendering the product natural gas suitable for most uses where a "sweet" gas is required. The large quantity of sulfur produced in the process presents a definite economic advantage over those processes which yield only the crystalline sulfur since the amorphous allotropic form is approximately ten times more valuable than the crystalline form.

Although the invention has been described with particularity in relating the manner in which certain specific embodiments thereof are to be practiced, it is contemplated that various alternatives to the specific conditions and steps hereinbefore set forth can be utilized without sacrifice of the objects and advantages of the invention, or without departure from the basic principles upon which it is based. Insofar, therefore, as any modifications and innovations may be made in the procedure, the materials utilized, or the conditions employed, such innovations and modifications, where based on the underlying principles hereinbefore outlined, are deemed to be cir-

We claim:

1. A method of producing sulfur comprising over 50% amorphous sulfur in admixture with other allotropic forms of sulfur from a hydrogen sulfide-containing gas which comprises contacting the gas with anhydrous liquid sulfur dioxide at a temperature wherein water crystallizes and wherein the hydrogen sulfide reacts with sulfur dioxide to form said sulfur and ice.

2. The method defined in claim 1 wherein the hydrogen sulfide-containing gas is contacted with liquid sulfur dioxide at atmospheric pressure at a temperature of from about $-60°$ C. to about $-10°$ C.

3. The method defined in claim 1 wherein the hydrogen sulfide containing gas is sour natural gas.

4. The method defined in claim 1 and further characterized to include the step of separating from the liquid sulfur dioxide, the sulfur produced in the reaction of hydrogen sulfide with sulfur dioxide; then separating said amorphous sulfur produced in the reaction from the other allotropic forms of sulfur produced in the reaction.

5. The method defined in claim 1 and further characterized to include the step of separating the ice and sulfur produced in said reaction from the liquid sulfur dioxide.

6. The method of sweetening sour natural gas as it is delivered under superatmospheric pressure from a source comprising:

expanding the sour gas to reduce the pressure thereof and to simultaneously reduce the temperature thereof to below the boiling point of sulfur dioxide and the freezing point of water; then passing the cold sour gas in heat exchange relation to anhydrous gaseous sulfur dioxide to condense the sulfur dioxide and to maintain the sulfur dioxide below its boiling point and the freezing point of ice; and contacting the sour gas with the liquid sulfur dioxide wherein the hydrogen sulfide reacts with the liquid sulfur dioxide to form sulfur comprising at least 50% of amorphous sulfur and ice.

7. The method of producing amorphous, carbon disulfide-insoluble sulfur from sour natural gas delivered under superatmospheric pressure from a source comprising:

using at least a portion of the pressure of said sour gas for converting gaseous sulfur dioxide to the liquid state by expanding said sour gas to reduce the pressure thereof and to simultaneously reduce the temperature thereof to a temperature below $10°$ C.; then passing the cold sour gas in heat exchange relation to gaseous sulfur dioxide to condense the gaseous sulfur dioxide and to maintain the temperature thereof in the range of $-60°$ C. to $10°$ C.;

contacting the sour gas with the liquid sulfur dioxide to produce solid sulfur comprising at least 50% amorphous sulfur in admixture with other allotropic forms thereof;

separating said solid sulfur from the liquid sulfur dioxide;

separating the amorphous sulfur from the other allotropic forms in the solid sulfur produced by contacting the sour gas with the liquid sulfur dioxide;

reacting the other allotropic forms of sulfur with oxygen to produce sulfur dioxide; and utilizing last said sulfur dioxide to contact sour gas.

References Cited

UNITED STATES PATENTS

| | | | |
|---|---|---|---|
| 2,448,719 | 9/1948 | Latchum | 23—3 |
| 2,909,410 | 10/1959 | Fedorko | 23—2 X |

OSCAR R. VERTIZ, *Primary Examiner.*

E. C. Thomas, *Assistant Examiner.*

U.S. Cl. X.R.

23—224

UNITED STATES PATENT OFFICE
CERTIFICATE OF CORRECTION

Patent No. 3,445,181           Dated May 20, 1969

Inventor(s) Richard L. Every et al.

It is certified that error appears in the above-identified patent and that said Letters Patent are hereby corrected as shown below:

Column 2, line 16, "pratice" should read -- practice --; line 19, "producedure" should read -- procedure --. Column 3, line 43, "3(43.6" should read -- 3(43.6) --. Column 4, line 4, "atambient" should read -- at ambient --; line 12, "altough" should read -- although --. Column 5, line 45, "likuid" should read -- liquid --; line 53, "conveyer" should read -- conveyed --. Column 6, in the Table, subscript definition 2, "has" should read -- was --; same column 6, line 59, after "sulfur" insert -- µ --. Column 8, line 12, "10° C." should read -- -10° C. --; line 16, "to 10° C." should read -- to -10° C. --.

Signed and sealed this 25th day of May 1971.

(SEAL)
Attest:

EDWARD M. FLETCHER, JR.          WILLIAM E. SCHUYLER, JR.
Attesting Officer                Commissioner of Patents